(No Model.)

W. C. H. AMENDE.
AUTOMATIC CHECK FOR HORSES.

No. 513,629. Patented Jan. 30, 1894.

Witnesses:
J. B. McGirr.
F. R. Harding.

Inventor:
William C. H. Amende,
Per N. W. FitzGerald & Co.
Attorneys.

UNITED STATES PATENT OFFICE.

WILLIAM CHARLES HENRY AMENDE, OF SAN DIEGO, CALIFORNIA.

AUTOMATIC CHECK FOR HORSES.

SPECIFICATION forming part of Letters Patent No. 513,629, dated January 30, 1894.

Application filed January 3, 1893. Serial No. 457,194. (No model.)

*To all whom it may concern:*

Be it known that I, WILLIAM CHARLES HENRY AMENDE, a citizen of the United States, residing at San Diego, county of San Diego, and State of California, have invented a new and useful Article for the Automatic Checking and Unchecking of Horses, which I have designated by the name of Automatic Check, of which the following is a specification.

My invention relates to a novel device in the form of an attachment for the check-rein whereby the operator can check or uncheck the horse without alighting from his seat in the vehicle.

The object of this improvement is to provide an appliance of this class which shall be simple, compact, and inexpensive in construction, ornamental and unobtrusive in appearance, and convenient and serviceable in use.

For the attainment of these objects, and for other purposes hereinafter enumerated, this invention comprises, in brief, certain details of construction, arrangement and combination of parts, all of which are more fully described hereinafter.

The novel features of the invention are embraced in the appended claims, which are intended to accord in their scope and meaning with the prior state of the art and the existing law.

Figure 1:
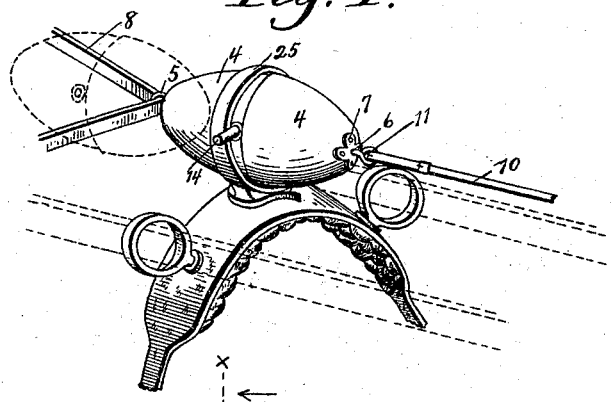
Figure 3:
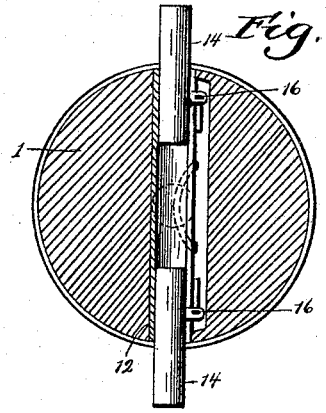
Figure 2:
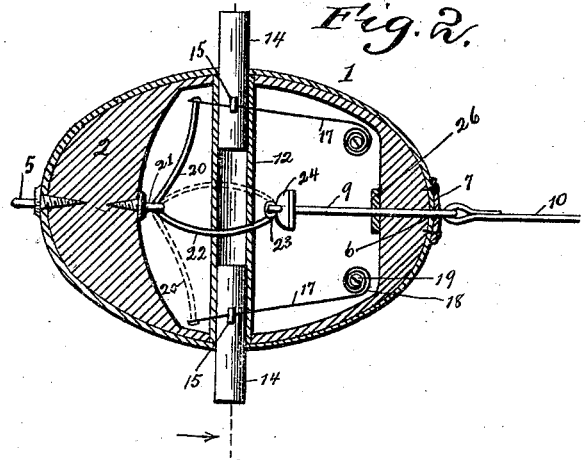
Figure 4:
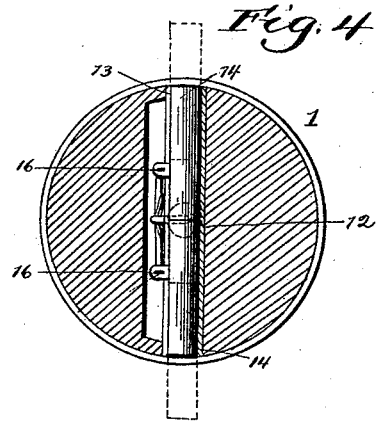
Figure 5:
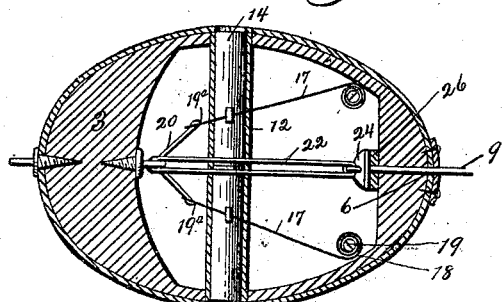
Figure 6:
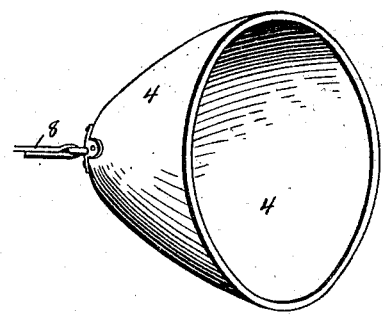

Referring to the accompanying drawings, Figure 1 is a perspective view showing my invention applied in locked position to a check-rein. Fig. 2 is a central longitudinal section of Fig. 1. Figs. 3 and 4 are severally transverse central sections on the line x—x of Fig. 2, looking in opposite directions, as shown by arrows in Fig. 2. Fig. 5 is a view similar to Fig. 2, showing the arms or stop-pins in contracted position, whereas in Fig. 2 they are expanded. Fig. 6 is a detail view of one half of the exterior shell or cover.

In all the views of the drawings, like numerals of reference denote like or corresponding parts.

In carrying out my invention, I provide a peculiar form of guide or casing to receive and protect the operating parts. This casing, 1, is made of some cheap and durable material, such as wood, and is interiorly recessed or hollowed out to admit, protect, and permit the operation of, the interior operating devices. In practice, I make this casing preferably of elliptical shape; however, the same may be elongated at will to assume the form of an exaggerated ellipse, or any other form, just so long as the opposite ends of the same are made round and tapering from the middle toward the ends, so that these tapered ends will serve to guide and direct the device in its forward and backward movement through the terret ring of the saddle.

The casing, 1, is made in two twin sections or halves, 2, 3, as shown in Figs. 2 and 5, mutually recessed at their meeting faces, and formed by splitting the ellipse longitudinally and centrally into two equal portions. Thus, the casing is centrally divisible, and the twin sections are held together and in contact by the exterior elliptical shell composed of the two twin semi-elliptical sections, 4, (see Fig. 5) made by cutting a hollow ellipse slightly larger than the casing, 1, centrally and transversely. These incasing sections 4 are fastened over the interior casing by screws or other detachable fastening whereby the casing and the interior parts are rendered accessible. To the apex of the front section 4 is screwed the eye-bolt 5, while the opposite or rear end of the rear section 4 is provided with a guide-orifice 6 which is protected and prevented from enlargement or wear by the guard-cleat 7 screwed over the rear end of the section and provided with an orifice coincident with the orifice 6. To the eye-bolt 5 is secured the check-rein 8; and to the draw-bar 9, which projects through the orifice 6, is attached the operating rein or strap 10 looped through the eye 11 on the rear outer extremity of said rod 9.

On the transverse axial line of the casing, 1, and to one section, 2, thereof is secured a slotted metal tube, 12, terminating at each extremity flush with the outside of the casing, and provided linearly on its upper side with a slot, 13. Working loosely in this tube are two stop-pins or arms 14, each equal in length to one half the length of the tube, and arranged to be expanded and contracted laterally in said tube by means of the devices now about to be described. At a suitable point on each arm or pin 14 is formed a lug, 15, projecting up through the slot, 13, and provided with an eye, 16, which is located in a plane higher than the plane of the tube, and embraces the spring-arm, 17, which passes loosely through the eye, and at its rear extremity is formed into the volute spring, 18, fixed to, and held by, the stationary screw, 19. Thus, it will be clear that there are two eyes 16, each having a spring arm 17 passing therethrough, and each spring arm intersecting the arm or plunger 14 approximately at right-angles.

The forward end of each spring-arm 14 is provided with an eye, 19ª, in which is fastened one end of a flexible connection, 20, preferably a cat-gut string. This flexible connection is supported centrally by an eye-bolt, 21, screwed into one section of the casing, and the said string is looped and crossed through this eye-bolt, 21, one end passing to the left to the eye of one spring-arm and the other passing to the right to the eye of the opposite spring-arm. The rear end of the loop, 22, of this string passes through the eye 23 formed on the inner end of the draw-bar 9. The inner end of the draw-bar 9 is provided with a limiting head 24 adapted to contact with the stop 26 when the bar 9 is drawn back to the limit of its backward play.

By the construction just described, it will be understood that by drawing back the bar, 9, the loop 22 will be elongated, the forward ends of the spring arms 17 will be drawn together, and the arms or pins, 14, will be contracted inwardly so that their projecting outer ends will be flush with the side of the casing 1. On the other hand, when the operator releases the strap or rein 10, the retractile agency of the spring-arms 17 serves to expand the arms 14 in such manner that they project outside of the casing.

In practice, I provide a terret-ring 25 on the center of the top of the harness saddle, which ring is slightly larger in diameter than the transverse diameter of the shell which incases the casing 1.

The parts being in the position shown in Fig. 1, should the operator desire to uncheck the horse for any purpose, he simply pulls back on the strap 10, which action causes the contraction of the two arms 24, so that they are no longer an impediment to the forward movement of the device, which being less in diameter than that of the terret-ring, will be free to slide forward through said terret-ring under the pull or strain of the horse until the ellipse passes forward clear of the terret-ring. When it is desired to re-check, the operator simply pulls back on the strap 10 until the arms 24 are to the rear of the terret-ring. Then he releases the strap quickly, which causes the two arms to quickly and simultaneously expand and project out in position to engage the side of the ring to prevent the pull of the horse from carrying the ellipse through the ring.

It will be obvious that I may employ any form of flexible connection in lieu of the cat-gut strings; that I may make the casing, shell, or any other part of any desired or approved material; and that I may vary the form, proportion, and details of construction of my invention as long as I do not depart from the scope of the claims hereunto annexed.

Having thus fully described my invention, what I claim, and desire to secure by Letters Patent, is—

1. A device of the class described, comprising a guide tapered at both ends, made in two sections detachably secured together, and containing expansible stop-pins adapted to automatically lock against the terret ring, in combination with means for controlling the action of said stop-pins.

2. In a device of the class described, the combination with a combined guide and casing consisting of an elliptical body made in twin sections detachably secured together; and an exterior shell of similar shape also divided into twin sections detachably secured together; of operating mechanism inside of, and protected by, the guide or casing, and adapted to lock against the terret-ring, and to be under the control of the operator.

3. In a device of the class described, the combination, with the check-rein, the guide attached at its front end thereto; the terret ring of the harness of larger diameter than the guide; and the operating strap; of the expansible stop-pins slidably mounted inside of the guide and adapted to be expanded and contracted laterally and simultaneously; a pair of spring-arms tending to hold the stop-pins in extended positions; a flexible connection between the free ends of said spring-arms; and a draw-bar connected to the flexible connection intermediate of the ends of the spring-arms, and attached at its outer end to the operating strap.

4. In a device of the class described, the combination with a guide; of a slotted tube inside of same and forming a transverse axis of the guide; stop-pins slidably mounted in said tube; a lug on the exposed side of each stop-pin; a flexible spring-arm having its free end passing through an eye in the said lug of each stop-pin, and having its other extremity fixed; and means for contracting the said stop-pins.

WILLIAM CHARLES HENRY AMENDE.

Witnesses:
  E. M. BURBECK,
  R. V. DODGE.